April 27, 1943.  V. LEHTO  2,317,781

FISH LURE

Filed Feb. 11, 1942

INVENTOR:
VAINO LEHTO
BY
ATTORNEY.

Patented Apr. 27, 1943

2,317,781

UNITED STATES PATENT OFFICE 2,317,781

FISH LURE

Vaino Lehto, Sudbury, Ontario, Canada

Application February 11, 1942, Serial No. 430,400

2 Claims. (Cl. 43—42)

This invention relates to fish lures and particularly to lures of the type that simulate a small fish in appearance.

An object of the invention is to provide a lure having flexible fins and tail whereby in the passage of the lure through the water, the action of a live fish is simulated. A further object is to provide means for imparting motion to the fins. Another object is to provide a lure having its hooks so positioned relatively to the tail that the latter substantially conceals the hooks.

Other objects, advantages and structural details of the invention will be apparent from the following description, with particular reference to the accompanying drawing, in which.

Figure 1:
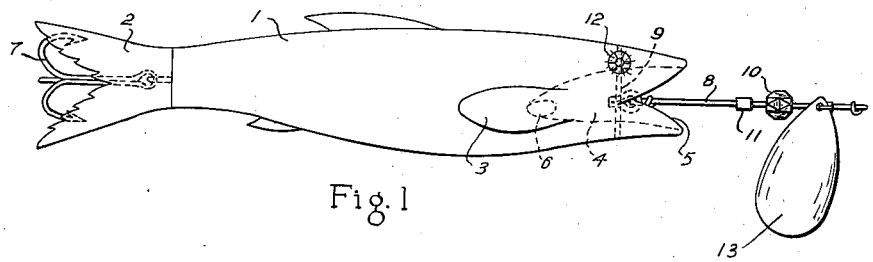
Figure 1 is an elevational view of the lure.
Figure 2:
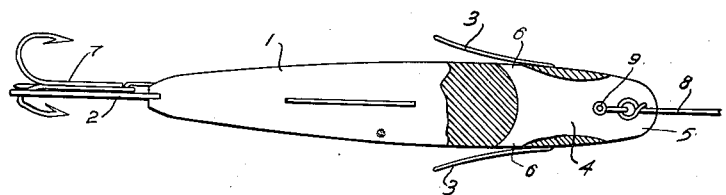
Figure 2 is a plan view, partly in section.
Figure 3:
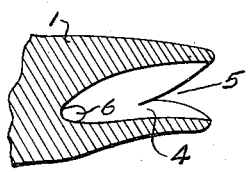
Figure 3 is a partial sectional elevation.

In the drawings, 1 is a body of wood or other suitable material shaped to simulate the body of a small fish and having attached thereto a tail 2 and lateral fins 3. The tail and fins are formed of thin rubber, leather or other suitable flexible material.

Means for positively imparting motion to the fins 3 during passage of the lure through water comprises a water passage 4 having an inlet 5 at the open mouth of the body and a pair of outlets 6 located one at each side of the body under the forward portion of a fin 3.

Hooks 7 are secured to the rear of the body at one side of the tail whereby they are substantially concealed thereby. The flexibility of the tail renders possible such positioning of the hooks.

A line connecting link 8 is secured to the body at 9 and extends through the open mouth thereof. Slidingly mounted on the link is a bead 10, preferably coloured and having a plurality of reflecting surfaces thereon. The bead has sliding movement between a stop 11 on the link and the outer end thereof. The bead is adapted to represent an edible object which, being positioned a short distance ahead of the open-mouthed lure, is intended to convey the idea of a small fish pursuing such an object and about to catch it. It is believed that such a sight stimulates the tendency of a larger fish to strike at the lure and to a further degree simulates the action of an actual fish. A thin oval-shaped metal plate 13, having a shiny, light-reflecting surface, is preferably also slidingly mounted on the link ahead of the bead 10.

The eyes 12 are preferably formed of coloured glass having a plurality of reflecting surfaces.

The lure described is thus believed to develop in high degree the appearance and actions of an actual fish and therefore to be particularly effective in use.

It is apparent that various changes in details of the device may be made without departing from the spirit and scope of the invention as defined in the appended claims.

I claim:

1. A fish lure closely simulating a fish in appearance and comprising a body having a substantially accurately fashioned fishlike shape and including a head having an open mouth, a pair of laterally positioned fins and a tail, said tail and fins consisting of thin flexible material, said body having one only set of hooks secured thereto, said hooks being secured to the rearward end of the body and lying on one side of said tail in opposed relation thereto, said tail being substantially at least as wide and as long as the overall width and length, respectively, of said set of hooks whereby the latter may be screened from view by the tail.

2. A fish lure closely simulating a fish in appearance and comprising a body having a substantially accurately fashioned fishlike shape and including a head having an open mouth, a pair of laterally positioned fins and a tail, said tail and fins consisting of thin flexible material, said body having a water passage therein, said passage having an inlet coinciding with the open mouth and a pair of outlets, one at either side of the body and underlying one of said fins, a line connecting link secured to the forward end of the body and extending through the open mouth, and a bead simulating an edible object slidingly mounted on said link in spaced forward relation to the open mouth.

VAINO LEHTO.